(12) United States Patent
Bode et al.

(10) Patent No.: US 6,249,246 B1
(45) Date of Patent: Jun. 19, 2001

(54) LOCATION SENSOR HAVING A SATELLITE RECEIVER FOR POSITION DETERMINATION

(75) Inventors: Friedrich-Wilhelm Bode, Apelern; Volkmar Tanneberger, Hildesheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,839

(22) PCT Filed: Oct. 17, 1997

(86) PCT No.: PCT/DE97/02402

§ 371 Date: Jul. 8, 1999

§ 102(e) Date: Jul. 8, 1999

(87) PCT Pub. No.: WO98/20304

PCT Pub. Date: May 14, 1998

(30) Foreign Application Priority Data

Nov. 4, 1996 (DE) .............................. 196 45 394

(51) Int. Cl.$^7$ .................................. H04B 7/185
(52) U.S. Cl. ......................................... 342/357.14
(58) Field of Search .......................... 342/357.14

(56) References Cited

U.S. PATENT DOCUMENTS

| | | |
|---|---|---|
| 4,731,613 | 3/1988 | Endo et al. . |
| 4,903,212 | 2/1990 | Yokouchi et al. . |
| 5,075,693 | 12/1991 | McMillan et al. . |
| 5,210,540 | 5/1993 | Matsumoto . |
| 5,517,199 | 5/1996 | DiMattei . |
| 6,061,021 | * 5/2000 | Zibell ............................. 342/418 |

FOREIGN PATENT DOCUMENTS

| | | |
|---|---|---|
| 42 19 929 | 12/1992 | (DE) . |
| 43 06 640 | 8/1994 | (DE) . |
| 195 13 244 | 10/1996 | (DE) . |
| 2 709 545 | 3/1995 | (FR) . |

OTHER PUBLICATIONS

Thomas Kerr, "Decentralized Filtering and Redundancy Management for Multisensor Navigation," IEEE Transactions On Aerospace And Electronic Systems, vol. AES–23, No. 1, Jan. 1987, pp. 83–119.

Sturza, M. et al., "Embedded GPS Solves The Installation Dilemma," Navigation Into The 21st Century, Kissimmee, Nov. 29–Dec. 2, 1988, No. 1988, Nov. 29, 1988, Institute of Electrical and Electronics Engineers, pp. 374–380.

"Aided Inertial Land Navigation System (Ilana) With A Minimum Set Of Inertial Sensors," Position Location And Navigation Symposium (Plans), Las Vegas, Apr. 11–15, 1994, No. –, Apr. 11, 1994, Institute of Electrical And Electronics Engineers, pp. 284–291.

Peters M A G: "Development Of A TRN/INS/GPS Integrated Navigation System" Proceedings Of The Digital Avionics Systems Conference, Los Angeles, Oct. 14–17, 1991, No. CONF. 10, Oct. 14, 1991, Institute Of Electrical And Electronics Engineers, pp. 6–11.

INS/GPS navigation systems for land applications, Tranfield, R., Position Location and Navigation Symposium, Apr. 1996, IEEE, pp. 391–398.*

* cited by examiner

Primary Examiner—Thomas H. Tarcza
Assistant Examiner—Fred H Mull
(74) Attorney, Agent, or Firm—Kenyon & Kenyon

(57) ABSTRACT

A location sensor in which a satellite receiver, a rotation rate sensor constituting a direction sensor, and an acceleration sensor constituting a displacement sensor are arranged in a housing. The signals of these sensors are conveyed to a common filter, so that the location, the movement velocity, and/or the movement direction can be picked off at the output of the location sensor. The compact arrangement of the individual sensors makes possible multiple utilization of individual components, for example of filters.

12 Claims, 1 Drawing Sheet

LOCATION SENSOR HAVING A SATELLITE RECEIVER FOR POSITION DETERMINATION

FIELD OF THE INVENTION

The present invention is based on a location sensor having a satellite receiver for position determination.

BACKGROUND INFORMATION

It is known to use a location and navigation system for determining location, in particular of a motor vehicle. Sensors for determining direction of travel and distance traveled are often connected to the navigation system. To determine an absolute position of the motor vehicle, it is also possible to use a satellite receiver as known, for example, by way of the Global Positioning System (GPS).

Installation of the direction and displacement sensors on the motor vehicle is, however, relatively complex. On the other hand, position determination using the GPS receiver is relatively imprecise, so that in a densely packed network of streets an accurate location cannot always be determined. In addition, in built-up urban areas it is not possible to receive enough GPS satellites, so that location determination based on satellite reception is not always satisfactory. Moreover, both the signals of both the satellite receiver and the direction and displacement sensors must be processed using corresponding filters, so that location determination is not only unreliable but also complex.

SUMMARY OF THE INVENTION

The location sensor according to the present invention has, in contrast thereto, the advantage that because the sensors are arranged in the same housing, the location sensor can be of very compact configuration. This advantageously decreases not only assembly effort, but also manufacturing costs. It is particularly advantageous that because of the compact design, individual components for signal analysis, for example filters, can be used in multiple fashion, so that the production outlay for the location sensor is further reduced. As a result of the compatible data format at the output of the location sensor, it is also possible to replace conventional satellite receivers.

The features set forth in the dependent claims make possible advantageous developments of and improvements to the location sensor. It is particularly advantageous that a GPS and/or GLONASS system is used as the satellite receiver, since these systems are already installed and to some extent are authorized for civilian use.

The use of one or more acceleration sensors and/or a rotation rate sensor (gyro sensor) as displacement or direction sensors appears favorable because these sensors can be installed, independently of signal transducers of the motor vehicle, in the housing of the location sensor. Additional external vehicle installations and connectors can thereby be eliminated.

The additional use of a barometric altimeter or a temperature sensor means that the accuracy of the position determination can be monitored and improved. Since an altitude determination is also possible when enough GPS satellites are being received, comparison with the readings of the barometric altimeter makes it possible to calibrate the position determination. Since the working accuracy of the components used also depends on ambient temperature, these errors can advantageously be compensated for with the aid of the temperature sensor.

To allow a position determination or in order to calibrate the sensors, for example of the acceleration sensor, even when reception conditions for the sensor signals are very unfavorable, it is advantageous to provide for the connection of a speed transducer. The speed transducer can be a signal transducer, present on the vehicle, for a distance traveled, the signals of which are additionally usable for calibration of the acceleration sensor.

Connecting the individual sensors together to a common position filter allows the elimination of further subassemblies which would otherwise be necessary for each individual sensor. It is particularly favorable in this context that the sensor signals are weighted with a priority factor so that, for example, the position determination with the GPS receiver possesses the highest priority as long as enough satellite signals are receivable. If, on the other hand, satellite signals are no longer receivable, for example in a tunnel, the displacement sensor and the direction sensor receive the highest priority. These priorities are then maintained until the satellite signals are once again receivable with sufficient quality.

It is particularly advantageous that a Kalman filter is provided as the position filter. In this filter the errors of the individual sensors compensate for one another, thus improving the location result.

DETAILED DESCRIPTION

Figure 1:
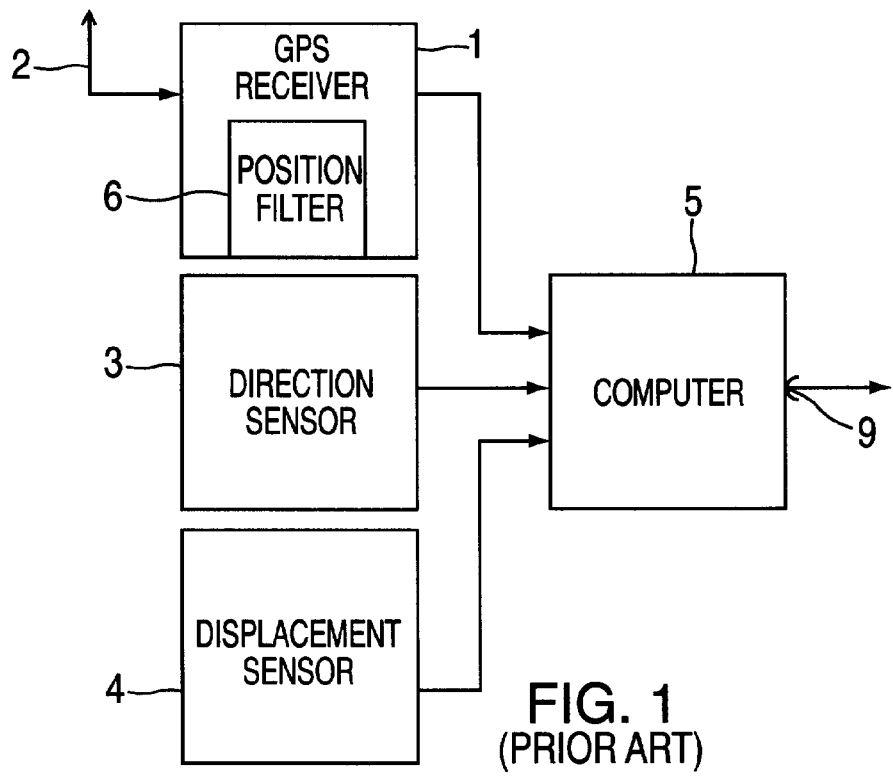
FIG. 1 shows a block diagram of a conventional location and navigation system.

FIG. 1 shows a conventional location system that is configured with a GPS receiver 1, a magnetic compass 3 as direction sensor, and a displacement sensor 4, for example with wheel sensors on a motor vehicle. GPS receiver 1 has a position filter 6 for determining location from the received satellite signals. The signals of these sensors are connected to a computer 5, at whose output 9 the position or location data can be picked off.

GPS receiver 1 as well as the individual sensors 3, 4 and computer 5 are installed in different housings, the individual housings being attached at respectively suitable points on the motor vehicle.

Figure 2:
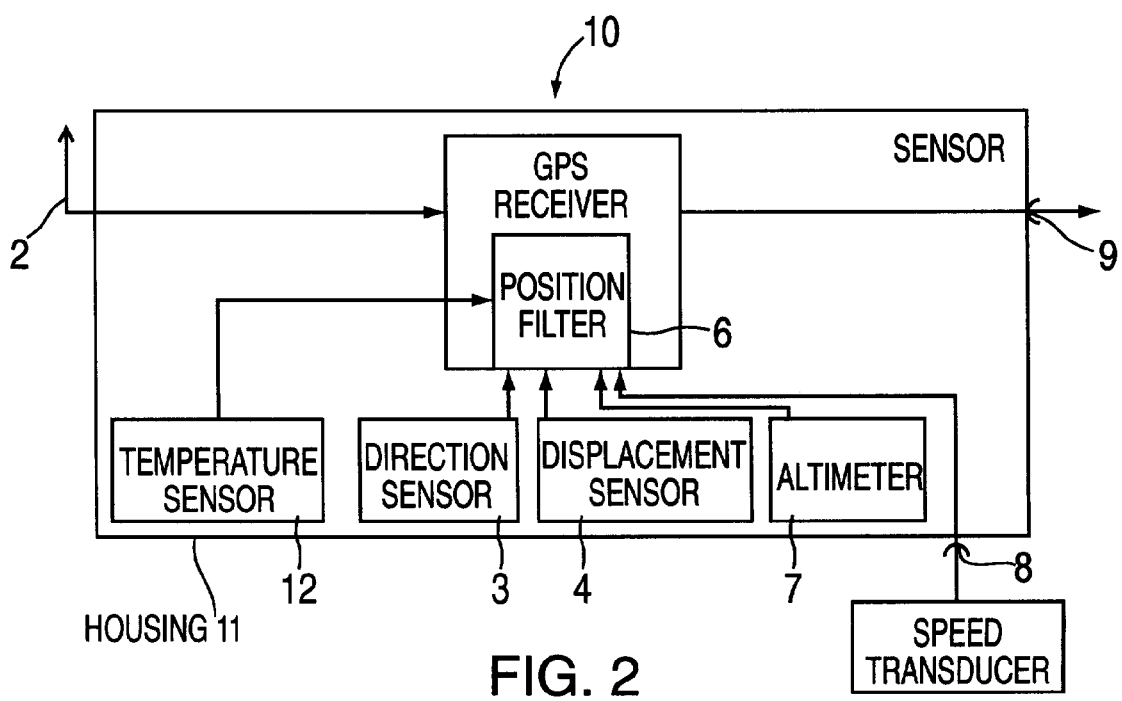
FIG. 2 shows an exemplary embodiment of a location sensor according to the present invention.

FIG. 2 shows an exemplary embodiment according to the present invention of a location sensor 10 in whose housing 11 satellite receiver 1 is arranged, with direction sensor 3 and displacement sensor 4, as a compact unit. The displacement sensor is configured, for example, as an integrating rotation rate sensor (gyro sensor). The gyro sensor is known per se, and therefore needs no further explanation. What is provided as displacement sensor 4 is an acceleration sensor from whose signals a distance traveled can be calculated by integration. The outputs of these sensors are switched to a position filter 6. Position filter 6 is preferably configured as a Kalman filter.

To further improve the availability of the position data, a temperature sensor 12 and/or a barometric altimeter 7 can be provided. Their outputs are also connected to position filter 6. In a further embodiment of the present invention, a speed transducer 14 is provided as the displacement sensor; its signals are also conveyed via an external connection to position filter 6. Additionally, an antenna 2 is provided for satellite receiver 1. Position filter 6 calculates, from the signals of the individual sensors, the instantaneous vehicle position, direction of travel, and distance traveled, and makes these data available in a compatible data format at an output 9.

The Kalman filter is a optimum filter that supplies, from the system dynamics, the stochastic parameters of the process and measurement noise, and an initial datum, an estimate of the system status at minimum estimation error. A detailed description may be found in Robert Grover Brown, Patrick Y. C. Hwang, "Introduction to Random Signals and Applied Filtering," John Wiley & Sons, Inc., New York, 1992.

The manner of operation of this arrangement will now be explained in more detail. Position filter 6 is designed so that it processes the signals of all the sensors and signal transducers connected to it. It is configured as a Kalman filter, and can compensate for the individual errored signals of the sensors connected to it, so that an actual located position is output with the greatest possible probability.

Since both the signals of satellite receiver 1 and the signals of direction and travel sensors 3, 4 are errored (and the errors of direction and travel sensors 3, 4 tend in particular to accumulate), an effort is made with the aid of the arrangement according to the present invention to minimize the errors in order to determine a maximally reliable located position. According to the present invention, the signals of the individual components are weighted with a priority factor. The weighted signals can then be analyzed according to the rules of dead-reckoning navigation. For example, if enough GPS satellites are receivable, the position determination of satellite receiver 1 then receives the highest priority, for example a factor of 1, while direction sensor 3 and displacement sensor 4 receive a factor of 0. If satellite reception is impeded under poor reception conditions, for example in built-up urban areas or in a tunnel, GPS receiver 1 then receives the lowest priority factor, e.g. 0. Since position filter 6 is continuously feeding back and comparing the position data obtained from gyro sensor 3 and acceleration sensor 4, concurrently with the position data of satellite receiver 1, the vehicle position can thus be ascertained even if no GPS signals are available. In this case gyro sensor 3 and acceleration sensor 4 receive the highest priority, e.g. a value of 1. As soon as enough satellites are once again receivable, the last position is compared to the position determined by satellite receiver 1 and corrected if necessary. This weighting of the priority factor as a function of reception quality results in a highly accurate located position. The individual sensors 3, 4 thus monitor one another, so that not as much individual importance is placed on the accuracy of the individual sensor itself. Since gyro sensor 3 and acceleration sensor 4 are used only for a limited distance, the accumulated errors of these sensors are advantageously also limited. A somewhat more inaccurate and therefore more economical consumer-grade gyro sensor can then be used as the gyro sensor, since its data are weighted only if the more precise measured data of GPS receiver 1 are not available for calculating the position data.

The use of temperature sensor 12 and/or barometric altimeter 7 allows a further optimization of the located position.

In a further embodiment of the present invention, provision is made also to use the signal of speed transducer 14 as a displacement sensor. When an acceleration sensor 4 is used, provision is made to sense the acceleration in the three mutually perpendicular spatial axes so as to derive the displacement and direction information directly from the complex acceleration vector. In this case, the use of a gyro sensor to generate the direction information can be dispensed with.

If gyro sensor 3 and acceleration sensor 4 are embodied as a micromechanical component, preferably on a semiconductor chip, they can then be implemented as an integrated circuit or as a module on a circuit board, in a highly space-saving manner.

The compatible data output format yields the advantage that an existing GPS receiver 1 can be replaced, without additional outlay, with location sensor 10 according to the present invention.

What is claimed is:

1. A location sensor for a position determination, comprising:
    a satellite receiver including a position filter;
    a direction sensor having a first output signal;
    a displacement sensor having a second output signal, the first and second output signals being switched to the position filter;
    a housing accommodating the satellite receiver, the direction sensor and the displacement sensor; and
    a computing arrangement including an output arrangement, the computing arrangement weighting the first output signal, the second output signal and a third output signal of the satellite receiver as a function of a priority factor, the priority factor being weighted as a function of an availability of the first, second and third output signals, the computing arrangement providing data which is indicative of at least one of a location, a movement velocity, and a movement direction, the data being provided to the output arrangement and picked off in a compatible data format.

2. The location sensor according to claim 1, wherein the satellite receiver receives at least one signal from at least one of a GPS satellite and a GLONASS satellite.

3. The location sensor according to claim 1, wherein the displacement sensor includes an acceleration sensor.

4. The location sensor according to claim 3, wherein the acceleration sensor determines accelerations in three axes.

5. The location sensor according to claim 1, wherein the direction sensor includes at least one of a rotation rate sensor and a gyro sensor.

6. The location sensor according to claim 1, further comprising:
    a barometric altimeter situated in the housing, a barometric output of the barometric altimeter being connected to the position filter.

7. The location sensor according to claim 1, further comprising:
    a temperature sensor situated in the housing, a temperature output of the temperature sensor being connected to the position filter.

8. The location sensor according to claim 1, further comprising:
    an external sensor connecting to the housing, signals of the external sensor being provided, via an external connection, to the position filter.

9. The location sensor according to claim 8, wherein the external sensor includes a speed transducer.

10. The location sensor according to claim 1, wherein the position filter includes a Kalman filter.

11. The location sensor according to claim 1, wherein the location sensor is a part of a navigation system.

12. The location sensor according to claim 11, wherein a motor vehicle includes the navigation system.

* * * * *